US008161477B2

(12) United States Patent
Manczak et al.

(10) Patent No.: US 8,161,477 B2
(45) Date of Patent: Apr. 17, 2012

(54) PLUGGABLE EXTENSIONS TO VIRTUAL MACHINE MONITORS

(75) Inventors: Olaf Manczak, Hayward, CA (US); Christopher A. Vick, San Jose, CA (US); Michael H. Paleczny, San Jose, CA (US)

(73) Assignee: Oracle International Corporation, Redwood City, CA (US)

( * ) Notice: Subject to any disclaimer, the term of this patent is extended or adjusted under 35 U.S.C. 154(b) by 1092 days.

(21) Appl. No.: 12/035,102

(22) Filed: Feb. 21, 2008

(65) Prior Publication Data

US 2009/0217262 A1 Aug. 27, 2009

(51) Int. Cl.
*G06F 9/455* (2006.01)
*G06F 9/54* (2006.01)
(52) U.S. Cl. ............................................ 718/1; 719/328
(58) Field of Classification Search ........................ 718/1
See application file for complete search history.

(56) References Cited

U.S. PATENT DOCUMENTS

| 6,496,847 B1* | 12/2002 | Bugnion et al. ................ 718/1 |
| 2007/0028244 A1* | 2/2007 | Landis et al. ................ 718/108 |
| 2007/0300219 A1* | 12/2007 | Devaux ............................. 718/1 |
| 2008/0028410 A1* | 1/2008 | Cherkasova et al. ........... 718/104 |
| 2008/0189697 A1* | 8/2008 | Kachroo et al. ............... 717/171 |

OTHER PUBLICATIONS

Charu Chaubal, "The Architecture of VMware ESX Server 3i", VMware White Paper. Nov. 12, 2007.*
VMware, "Understanding Full Virtualization, Paravirtualization, and Hardware Assist", VMware White Paper, Nov. 17, 2007.*
"Virtualization Overview", White Paper, vmware, inc., Palo Alto, CA, 2006, pp. 11.
"Understanding Full Virtualization, Paravirtualization, and Hardware Assist", White Paper, vmware, inc., Palo Alto, CA, 2006, pp. 11.

* cited by examiner

*Primary Examiner* — Jennifer To
*Assistant Examiner* — Kevin X Lu
(74) *Attorney, Agent, or Firm* — Marsh Fischmann & Breyfogle LLP; Kent A. Lembke

(57) ABSTRACT

The functionality of a virtualization layer interposed between computer system hardware and a plurality of applications can be altered by pluggable extensions. According to one embodiment of the present invention, a virtualization layer is divided into a privileged portion and an unprivileged portion. While the privileged portion remains untouched, the functionality of the unprivileged portion can be modified by one or more pluggable extensions. Furthermore, file images operating on top of the virtualization layer, and in some cases unaware of the virtual nature of the virtualization layer, can be supplemented using pluggable extensions.

11 Claims, 2 Drawing Sheets

PLUGGABLE EXTENSIONS TO VIRTUAL MACHINE MONITORS

RELATED APPLICATION

This application is related to the subject matter disclosed in U.S. patent application Ser. No. 12/035,132 filed on Feb. 21, 2008 for "Dynamic Composition of an Execution Environment from Multiple Immutable File System Images" now U.S. Pat. No. 7,805,409 and U.S. patent application Ser. No. 12/035,154 filed on Feb. 21, 2008 for "Dynamic Transactional Instantiation of System Configuration Using a Virtual File System", both of which are co-assigned to Sun Microsystems, Inc., assignee of the present invention, and the disclosures of which are herein specifically incorporated by this reference.

BACKGROUND OF THE INVENTION

1. Field of the Invention

Embodiments of the present invention relate, in general, to systems and methods for computing virtualization and particularly to pluggable extensions to virtual machine monitors.

2. Relevant Background

Virtualization broadly describes the separation of a resource or request for service from the underlying physical delivery of that service. Virtual memory, for example, allows computer software to gain access to more memory than is physically installed in a computer via background swapping of data to disk storage. Virtualization techniques are applicable to multiple information technology infrastructure layers as they provide a layer of abstraction between computing storage and hardware and the applications running on the storage and hardware.

Virtualization enables multiple operating systems to run on a single physical system and share the underlying hardware resources. This is commonly known as partitioning and is one of many facets of virtualization. There are generally two approaches to partitioning, those being a hosted approach and a hypervisor architecture. The hosted approach provides partitioning services on top of a standard operating system and supports a broad range of hardware configurations. A hypervisor architecture uses a virtualization layer. This layer is the first layer installed and has direct access to the hardware resources. Thus this approach is more efficient and enables greater scalability and performance.

One enhancement to virtualization is paravirtualization. In computing, paravirtualization is a virtualization technique that presents a software interface to virtual machines that is similar but not identical to that of the underlying hardware. Paravirtualization is a tradeoff between operating system compatibility and performance. For certain central processor unit ("CPU") bound applications running on systems without virtualization hardware, paravirtualization assists and allows the virtual machine monitor to be simpler in that virtual machines that run on paravirtualization can achieve performance closer to non-virtualized hardware. Thus a paravirtualization model offers potential performance benefits when a guest operating system or application is aware that it is running with a virtualized environment and has been modified to exploit this environment. Operating systems must be explicitly ported to run on top of a paravirtualized virtual machine monitor. However, once modified, the guest operating system can never be migrated back to run on the physical hardware, and thus owners of proprietary operating systems may decline to allow paravirtualization for strategic purposes. In addition to requiring that the operating system be modified to run on the virtualized environment, paravirtualization leverages a hypervisor for the underlying technology and may require changes to the operating system kernel.

SUMMARY OF THE INVENTION

The functionality of a virtualization layer interposed between computer system hardware and a plurality of applications can be altered by pluggable extensions. According to one embodiment of the present invention, a virtualization layer is divided into a privileged portion and an unprivileged portion. While the privileged portion remains untouched, the functionality of the unprivileged portion can be modified by one or more pluggable extensions. Furthermore, applications and/or operating systems operating on top of the virtualization layer, and in some cases unaware of the virtual nature of the virtualization layer, can be supplemented using pluggable extensions.

According to one embodiment of the present invention, the functionality of a virtualization layer is altered via pluggable extensions. The unprivileged portion of the virtualization layer is configured to accept pluggable extensions that can modify or supplement the functionality of the virtualization layer. In other embodiments of the present invention, the file images running on top of the virtualization layer can also be supplemented by pluggable extensions. Combining these facets of the present invention provides software vendors with the flexibility to update and optimize their software without impacting the fundamental operations of the virtualization layer.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims may be necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein.

Figure 1:
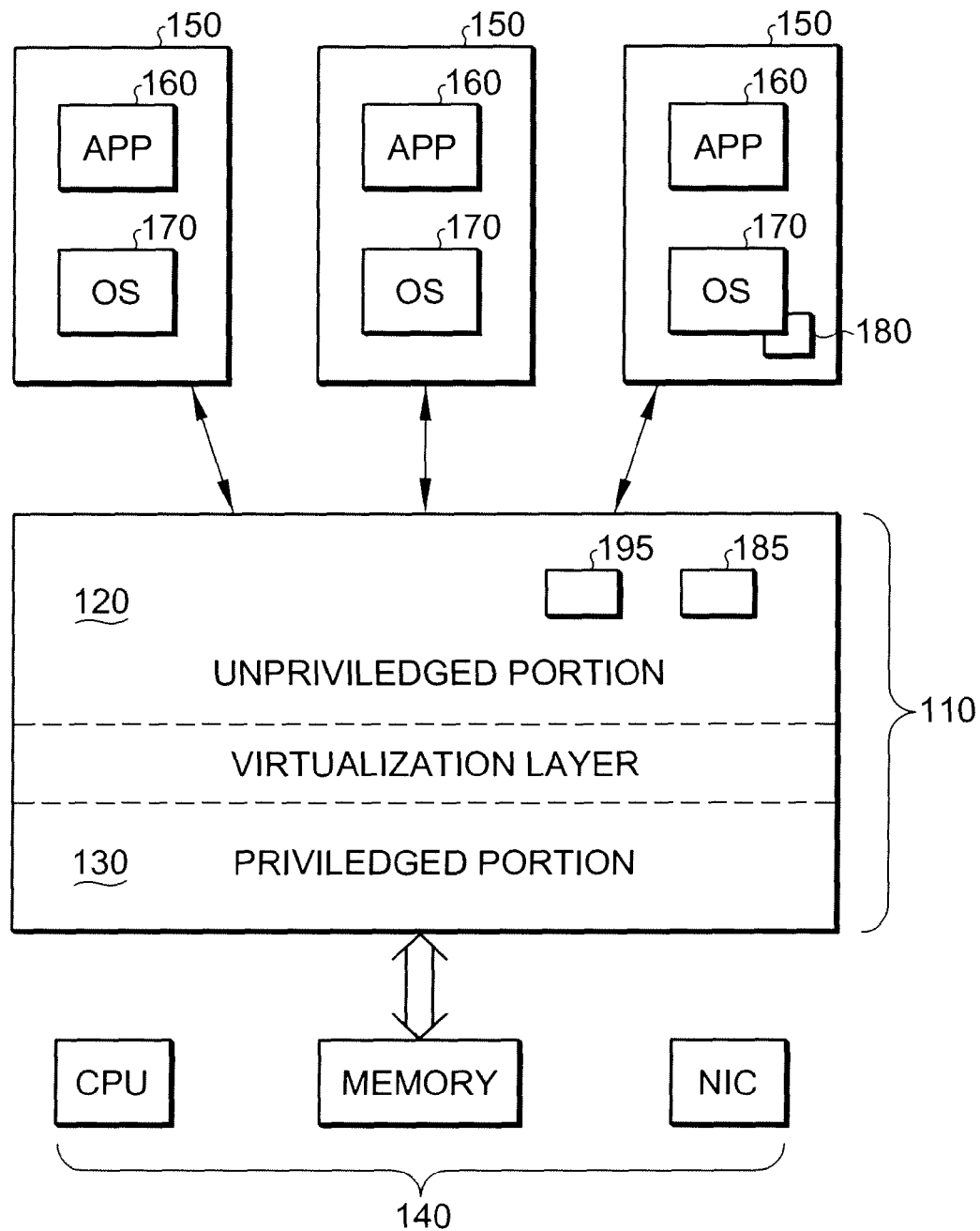
FIG. 1 shows a high level block diagram of a computer architecture including a virtualization layer according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Disclosed herein are systems and methods for dynamically altering the functionality of a virtualization layer. According to one embodiment of the present invention, a virtualization layer is interposed between computer system hardware and a plurality of applications, operating systems or other immutable file images. The virtualization layer is portioned into two portions. A first portion is classified as being privileged and includes legacy code that is maintained in a pristine form. A second portion is classified as being unprivileged and open to modification by pluggable extensions.

For purposes of the present invention, the term "dynamic" is defined to mean when the system is running, i.e., during run-time. Similarly, while the present disclosure is presented using immutable file images, one skilled in the art will appreciate that the present invention can be used with or without immutable file images as long as a virtual file system unifies other file systems. While the present disclosure is presented by way of examples using a single computing platform, one skilled in the art will recognize that the present invention can be equally applied to network applications, and, indeed, such an application is contemplated.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

FIG. 1 shows a high level block diagram of a computer architecture including a virtualization layer according to one embodiment of the present invention. Interposed between computer hardware 140 and a plurality of immutable file images (including operating system instructions 170 and software applications 160) is a virtualization layer 110. Computer hardware, as will be appreciated by one skilled in the art, includes a CPU, a memory, a network interface card ("NIC"), a storage device such as a hard disk, and the like. Similarly, code that is generally executed by this hardware 140 includes operating system instructions 170 and software applications 160.

According to one embodiment of the present invention, the virtualization layer 110 is divided into a privileged portion 130 and an unprivileged portion 120. The privileged portion 130 includes legacy code of the virtualization layer 110 (also referred to as a hypervisor). Legacy code of the virtualization layer is code that operating system and application vendors rely on in creating software that is compatible with a virtual machine.

A VMM, as discussed in connection with the present invention, is software that runs in a layer between the hypervisor and one or more virtual machines that provides the virtual machine abstraction to the guest operating systems. When full virtualization is in effect, as is disclosed herein, the VMM exports a virtual machine abstraction identical to a physical machine so that standard operating systems such as Windows, Linux, and the like can run just as they would on physical hardware. The hypervisor is a thin layer of software that provides virtual partitioning capabilities as discussed with respect to the present invention and runs directly on the hardware but underneath higher-level virtualization services. The VMM and the hypervisor are elements of the virtualization layer.

Typically, software that is executed in the virtual machine environments is packaged in the form of packages or images. For example, collections of Java classes that constitute a Java program or a Java library are packaged as JAR files—portable computer files with an internal structure known to the virtual machine. Operating systems and applications that execute within VMware or Xen virtual machines are packaged in the form of disk images—portable computer files with an internal layout identical to a computer disk.

Vendors can, to some degree, configure file images to be more compatible with VMMs and to operate more efficiently. As versions of the image are developed so to are the VMM optimizations. Thus it is advantageous for the VMM to be consistent and reliable. This, however, provides little flexibility to accept optimization modifications to the VMM. The present invention divides the VMM so as to preserve the legacy portion of the VMM as a reliable and consistent platform while enabling vendors to submit minor modifications that can optimize the performance of particular file images 150. By minimizing the complexity of the mandatory framework of the virtualization layer 110, the VMM becomes more attractive to a wide variety of vendors. Furthermore the metadata of images used by the privileged portion remains unchanged by the pluggable extension making the VMM, from a vendor's perspective, a consistent platform from which to operate.

As shown in FIG. 1, the virtualization layer 110 includes a privileged portion 130 that includes legacy code and an unprivileged portion 120 that is modifiable. According to one embodiment of the present invention, a vendor or similar entity can create a plug-in associated with a particular disk image 150 and modify small portions of the code in the unprivileged portion 120 of the virtualization layer 110. For example, the vendor of an operating system 170 can recognize that the operating system 170 may perform more efficiently in conjunction with the virtualization layer 110 if minor modifications occur. A plug-in 185 is created. The plug-in 185 modifies specific portions of the unprivileged VMM code without altering the code associated with the privileged portion 130 of the virtualization layer 110. According to another embodiment of the present invention, the vendor can also create an operating system plug-in 180 that supplements the file image. Thus the file image of the operating system 170 originally installed remains pristine as does the unprivileged portion 120 of the virtualization layer 110.

According to another embodiment of the present invention, a plug-in can be added to the virtualization layer 110 so as to enable new hardware capabilities to the virtualization layer 110 such as a new interconnect. Hardware specific extensions 195 can be added to the unprivileged portion 120 of the virtualization layer 110 so as to add new functionality to the VMM. Similarly new application programming interfaces can be introduced to the VMM. According to another embodiment of the present invention, the pluggable extensions run on top of existing applications and existing operating systems. The extensions can also be used to paravirtualize selected portions of the operating system or introduce new additional paravirtualized devices.

According to one embodiment of the present invention, pluggable extensions are essentially embedded into the package header or image metadata of an application that is running on top of the virtualization layer. The manner in which this is done means that the application image remains unchanged and thus is unaware of the virtualization layer itself. In addition, the extensible nature of the plug-in also ensures that the application is unaware of any changes introduced to the virtualization layer by the plug-in.

Figure 2:
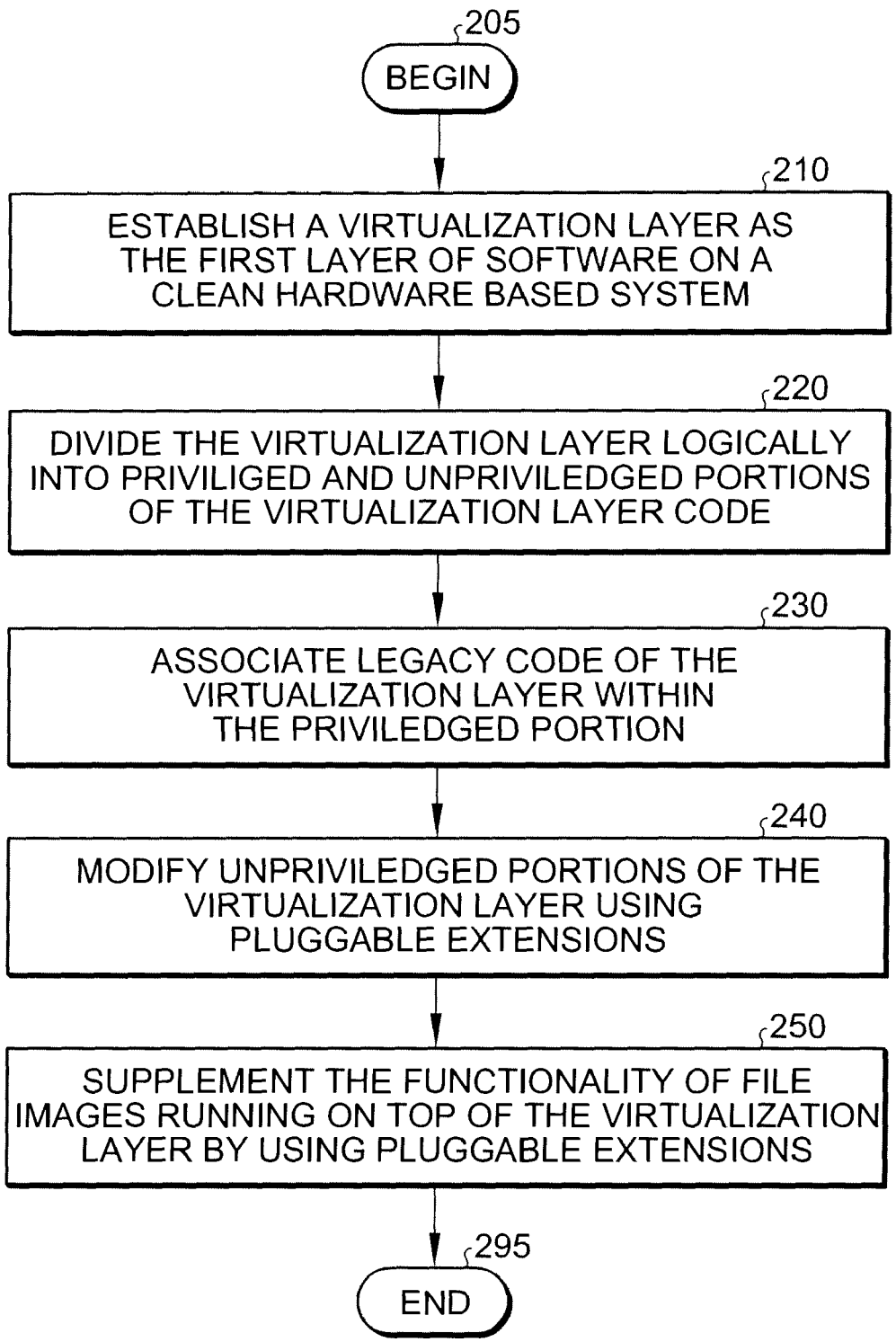
FIG. 2 shows a high level flowchart of one method embodiment for dynamically altering a virtualization layer according to the present invention.

FIG. 2 is a flowchart of one method embodiment for modifying a virtualization layer using pluggable extensions. The process begins 205 with the establishment 210 of a virtualization layer interposed between the physical hardware and a plurality of file images. This virtualization layer is the first layer of software on a clean hardware system and serves as the basis for all subsequent image execution.

The virtualization layer is thereafter logically partitioned (divided) 220 into a privileged portion 130 and an unprivileged portion 120. The code associated with fundamental operations of the virtualization layer is associated 230 with the privileged portion 130 and remains unchanged and protected from any attempt to cause its alteration. The unprivileged portion 120 is configured to accept supplements and changes 240 via pluggable extensions.

According to one embodiment of the present invention, the vendor of an application or operating system can create one or more plug-in extensions designed to modify 240 the code of the unprivileged portion of the virtualization layer. Once applied, this extension can add new functionality or alter existing functionality. In addition, plug-in extensions can be created and applied to supplement 250 the functionality of existing file images. The file image accepting these supplemental functionalities can be aware or unaware of the presence of the virtualization layer. For example the Java application is aware that the Java virtual machine exists but can be unaware of the plug-in changes to the virtual machine implementation. The process thereafter terminates 295. In this manner an operating system can introduce new additional application programming interfaces that would be harmless to the legacy code of the privileged portion of the virtualization layer and at the same time capable of being used through additional packages or modules running on top of the virtualization layer (for example, system management tools of a particular operating system)

The plug-in extension, according to one embodiment of the present invention, provides the ability to modify the hypervisor itself and can be extended to other VMMs beyond systems that imitate or enable concurrent sharing of a hardware platform. In particular the use of pluggable extensions to a virtualization layer is applicable to a modular design of a file system level hypervisor.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

While there have been described above the principles of the present invention in conjunction with specific computer virtualization architecture, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for virtualization layer optimization, the method comprising:
   dividing a virtualization layer logically into a privileged portion and an unprivileged portion wherein the privileged portion includes a hypervisor operating the virtualization layer on top of hardware resources, wherein the unprivileged portion comprises unprivileged code; and
   modifying, after the dividing step, the unprivileged portion of the virtualization layer using a pluggable extension,
   wherein the modifying step alters functionality of the virtualization layer,
   wherein the modifying includes modifying portions of the unprivileged code,
   wherein the pluggable extension introduces a new application programming interface to the virtualization layer, and
   wherein the hypervisor remains unchanged by the pluggable extension during virtualization layer optimization.

2. The method of claim 1 wherein the pluggable extension introduces support for a new hardware device.

3. The method of claim 2 wherein the new hardware device is an interconnect.

4. The method of claim 1 wherein the pluggable extension paravirtualizes select operating systems.

5. A computer architecture for optimizing hypervisor operations, the computer architecture comprising:
   a CPU;
   a memory;
   a virtualization layer disposed within said computer architecture, said virtualization layer including a privileged portion including a hypervisor operating the virtualization layer, and an unprivileged portion, wherein the unprivileged portion comprises unprivileged code; and
   a plurality of pluggable extensions disposed within said computer architecture and configured to modify functionality of the unprivileged portion of the virtualization layer,
   wherein the plurality of pluggable extensions are configured to modify the unprivileged code,
   wherein the plurality of pluggable extensions introduce a new application programming interface to the virtualization layer, and
   wherein the hypervisor remains unchanged by the plurality of pluggable extensions during virtualization layer optimization.

6. The computer architecture of claim 5 wherein the virtualization layer is interposed between a computer hardware architecture and a plurality of applications.

7. The computer architecture of claim 5 wherein the pluggable extensions paravirtualize select operating systems.

8. A computer system for virtualization optimization, the computer system comprising:
   a machine capable of executing instructions embodied as software; and
   a plurality of software portions, wherein:
      one of said software portions is configured to divide a virtualization layer logically into a privileged portion and an unprivileged portion wherein the privileged portion includes a hypervisor for operating the virtualization layer on top of hardware resources and wherein the unprivileged portion includes unprivileged code;
      one of said software portions is configured to modify the unprivileged portion of the virtualization layer and the unprivileged code using a first pluggable extension altering virtualization layer functionality, wherein the first pluggable extension introduces a new application programming interface to the virtualization layer; and
      one of said software portions is configured to supplement an immutable file image running on top of the virtualization layer using a second pluggable extension and wherein said immutable file image is unaware of said virtualization layer.

9. The method of claim 1 further comprising supplementing the functionality of a file image running on top of the virtualization layer by applying a plug-in extension to said file image.

10. The method of claim 1 further comprising supplementing the functionality of a file image running on top of the virtualization layer by applying a plug-in extension to said file image.

11. The method of claim 10 wherein said file image is unaware of the virtualization layer.

\* \* \* \* \*